(12) United States Patent
Chintala et al.

(10) Patent No.: US 6,345,097 B1
(45) Date of Patent: Feb. 5, 2002

(54) CAM RETAINER FOR FLIP-STYLE PORTABLE PHONE

(75) Inventors: Thomas J. Chintala; Jose F. Olivas; Paul J. Smith, all of San Diego; Sean Moran, Carlsbad; James Beckwith, San Diego, all of CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/206,540

(22) Filed: Dec. 7, 1998

(51) Int. Cl.[7] .......................... H04M 1/00; H04M 9/00; H04B 1/38
(52) U.S. Cl. ...................... 379/433.13; 455/90
(58) Field of Search .................. 455/90; 379/433, 379/419, 433.13

(56) References Cited

U.S. PATENT DOCUMENTS 5,278,993 A * 1/1994 Reiff et al. .................... 455/90
5,848,152 A * 12/1998 Slipy et al. .................. 379/433

* cited by examiner

Primary Examiner—Jack Chiang
Assistant Examiner—Thjuan P Knowlin
(74) Attorney, Agent, or Firm—Philip R. Wadsworth; Charles D. Brown

(57) ABSTRACT

A portable phone has a cavity at one end in which a hinge pin is rotatably mounted, with opposite ends of the hinge pin releasably secured to a flip panel rotatable between a closed position extending over part of one face of the phone, and an open position. The hinge pin includes a cam formation, and a biasing spring secured in the cavity has a bearing portion acting against the cam portion to releasably retain the flip panel in its open and closed positions. A cam retainer is mounted in the cavity to extend over the hinge pin and resist bending of the hinge pin out of a straight, axial orientation.

9 Claims, 2 Drawing Sheets

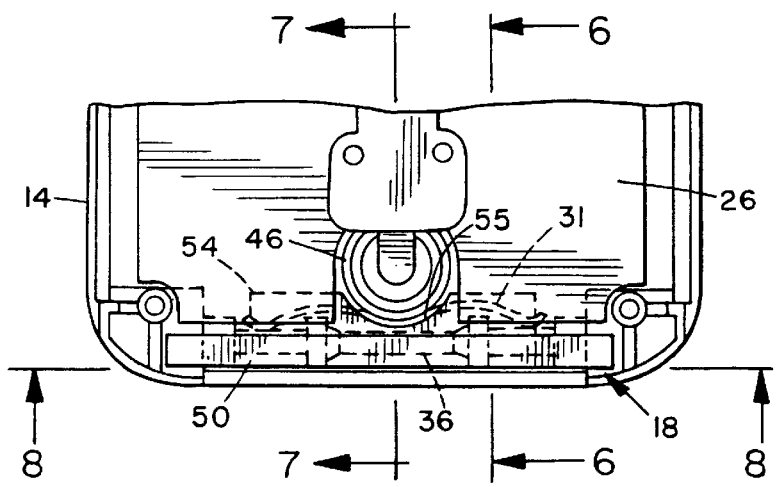
FIG. 5
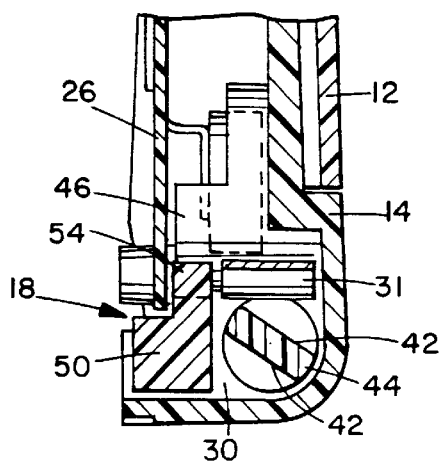
FIG. 6
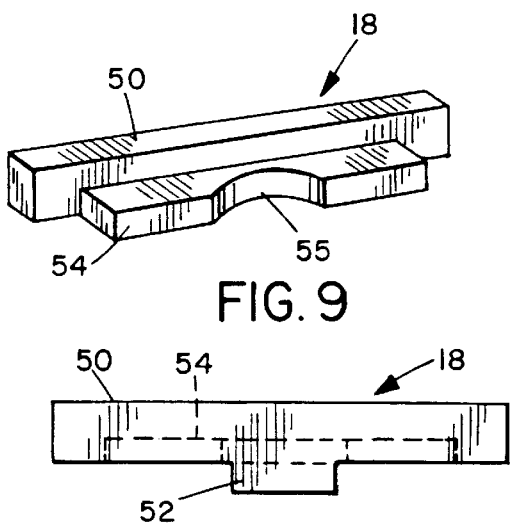
FIG. 9
FIG. 10
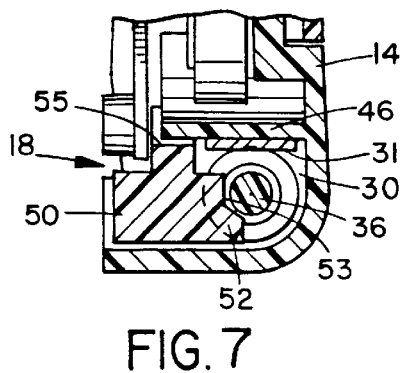
FIG. 7
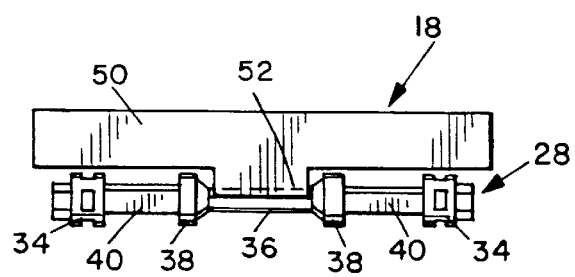
FIG. 8

CAM RETAINER FOR FLIP-STYLE PORTABLE PHONE

BACKGROUND OF THE INVENTION

The present invention relates generally to portable phones with a hinged lid or cover, and is particularly concerned with a cam retainer for a snap hinge mechanism which snaps the cover into the open and closed positions.

In our co-pending application No. 09/045,153 filed Mar. 19,1998 and entitled "Snap Hinge Mechanism for Flip Style Portable Phone", the contents of which are incorporated herein by reference, a snap hinge mechanism is described in which a hinge pin is biased by a spring into the open and closed positions. The spring acts on a pair of spaced cam portions on the hinge pin so that rotation of the flip or cover in either direction first compresses the spring, and then releases the spring so that the cover is snapped into the open or closed position.

Due to the axial loading and bending forces on the hinge or cam pin, the cam may bend or bow. Such bending may reduce the axial dimension sufficiently to allow the flip cover to disengage from the cam and phone. The user must then re-assemble the parts, which can be difficult and inconvenient.

SUMMARY OF THE INVENTION

It is an object of the present invention to provide a new and improved snap hinge mechanism for flip style portable phones with a retainer which reduces the risk of bending or bowing of the hinge pin.

According to the present invention, a portable phone is provided which comprises a phone housing having a keypad on one face, a first end and a second end, a cover hinged to the second end of the housing for movement between a closed position covering at least part of the keypad and an open position, and a hinge mechanism pivotally connecting the cover to the second end of the housing, the hinge mechanism comprising a hinge pin rotatably mounted in the second end of the housing and releasably secured to the cover, and a cam retainer secured in the second end of the housing adjacent the hinge pin and having a portion adjacent a central part of the pin for resisting bending of the pin and disengagement from the cover.

Preferably, the hinge pin is rotatably mounted in a cavity at the second end of the housing and has opposite end portions releasably engaged in corresponding recesses in the cover, and the cam retainer is also mounted in the cavity to extend over one side of the pin. In a preferred embodiment of the invention, a spring member is also mounted in the cavity and bears against the hinge pin so as to urge the cover into the open position as the cover is rotated towards the open position, and into the closed position as the cover is rotated towards the closed position. Preferably, the hinge pin has enlarged cam portions on opposite sides of a central portion of the pin, and the cam portions have opposing flat faces against which the spring acts in the open and closed positions, respectively, so as to releasably hold the hinge pin in the respective positions unless the flip or cover is positively urged away from the position.

As the cover is rotated, simultaneously rotating the pin about the hinge axis, cam surfaces between the flat faces will first compress the spring to increase the biasing force on the hinge pin, and then release the spring after the hinge pin has been rotated through a predetermined angle, snapping the cover into the open or closed position. The cam retainer has recessed areas for extending over the cam portions so that the cam portions can rotate freely back and forth as the cover is opened and closed, and a projecting portion between the recessed areas for extending into close proximity with the central portion of the hinge pin, in order to resist bowing of the pin in this region.

The cam retainer thus prevents the cam or hinge pin from bowing or bending at the center, which was previously a problem, and therefore reduces the risk of the cover separating from the phone housing, keeping the cover engaged with the phone.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 5 is a view similar to FIG. 3, with the cam retainer and the keyboard in place;

FIG. 6 is an enlarged sectional view taken on line 6—6 of FIG. 5;

FIG. 7 is an enlarged sectional view taken on line 7—7 of FIG. 5;

FIG. 8 is a view taken on line 8—8 of FIG. 5, with the basic structure omitted to show the relationship of the cam and cam retainer;

FIG. 9 is a perspective view of the cam retainer; and

FIG. 10 is a rear view of the cam retainer.

DESCRIPTION OF THE PREFERRED EMBODIMENT

Figure 1:
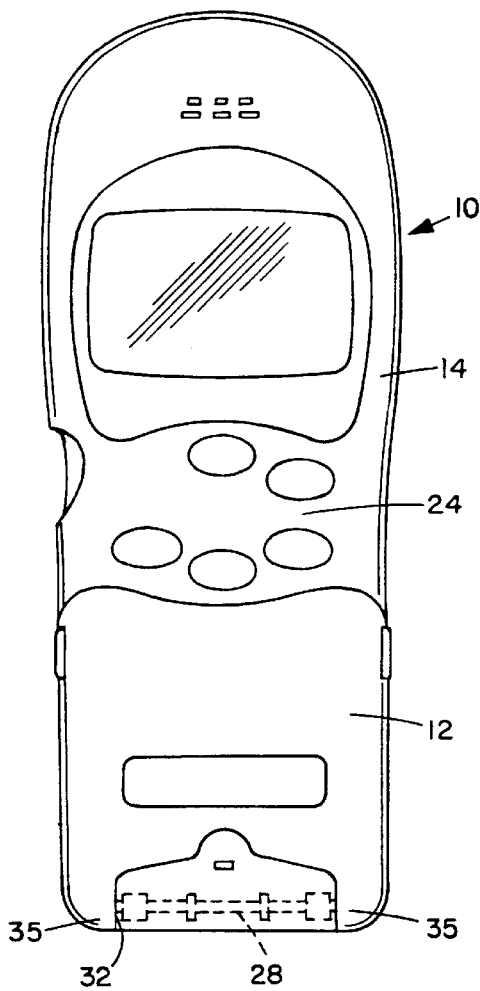
FIG. 1 is a front view of a portable phone incorporating a snap hinge mechanism with a cam retainer according to a preferred embodiment of the present invention.
Figure 2:
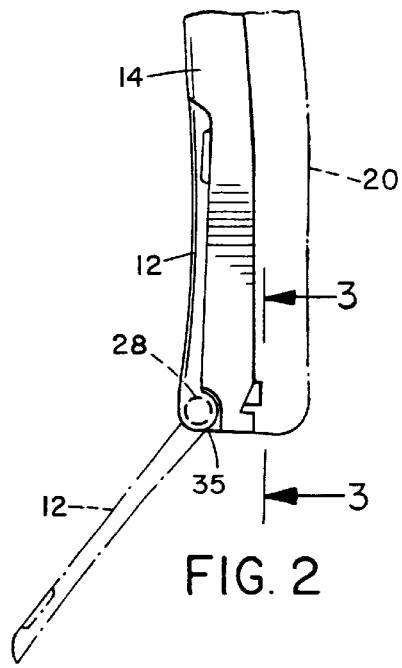
FIG. 2 is a side view of the lower portion of FIG. 1, showing the two positions of the flip panel or cover.

FIGS. 1 to 7 of the drawings illustrate a portable phone 10 with a flip panel or cover 12 hinged at one end to the phone front or top housing 14 via a snap hinge assembly 16 incorporating a cam retainer 18 according to a preferred embodiment of the invention. The cam retainer 18 is illustrated in more detail in FIGS. 8 to 10. A rear or lower housing 20 holding the main circuit board and phone circuitry and components is secured to the front housing 14, as illustrated in dotted outline in FIG. 2.

The hinge assembly 16 apart from the cam retainer 18 is preferably substantially identical to that described in our copending application Serial No. 09/045,153, referred to above, the contents of which are incorporated herein by reference. The flip panel 12 is designed to fit into a recessed region 22 on the front face of the phone front housing 14 when in the closed position illustrated in FIGS. 1,2, and 4. In the closed position, panel 12 covers at least part of a key pad 24 comprising a plurality of keys extending from board 26 through openings provided in the front face of housing 14.

The hinge assembly 16 basically comprises a hinge or cam pin 28 rotatably mounted in a cavity or chamber 30 at one end of the front housing 14, a leaf spring member 31 biasing the cam pin 28 into two end positions, and the cam retainer 18 which resists axial bowing or arching of the pin 28. The chamber 30 has end walls 32 through which opposite end portions 34 of the pin 28 project. The flip panel 12 has a pair of spaced ears 35 for fitting over opposite ends of the cavity adjacent walls 32, and the pin end portions 34 are designed for releasable snap engagement in aligned recesses (not visible in the drawings) in ears 35. Thus, rotation of the flip panel 12 between the closed position of FIGS. 1 and 2 and the open position illustrated in dotted outline in FIG. 2 will simultaneously rotate cam pin 28 in cavity 30.

Figure 4:
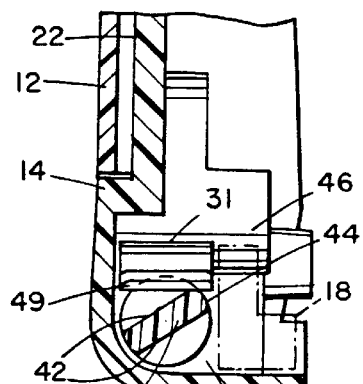
FIG. 4 is an enlarged sectional view taken on line 4—4 of FIG. 3.
Figure 3:
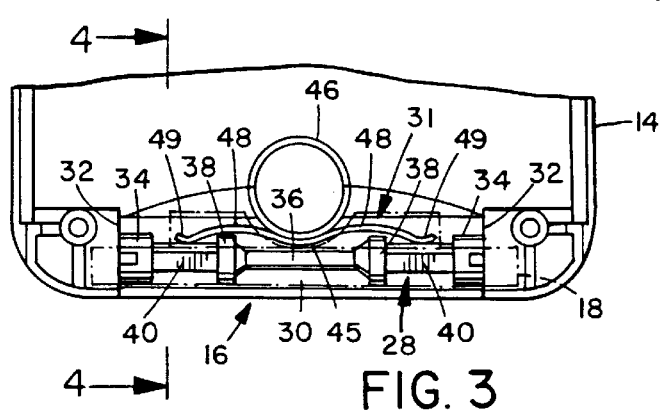
FIG. 3 is an enlarged view taken on line 3—3 of FIG. 2, the cam retainer being indicated in broken line.

As best illustrated in FIG. 3, the cam pin 28 has a central portion 36 terminating in annular flanges 38, and cam portions 40 projecting from the respective flanges 38 up to end portions 34. Each cam portion 40 has opposing flat faces 42 with rounded end edges 44 extending between the flat faces, as best illustrated in FIGS. 4 and 6.

The leaf spring member 31 is of any suitable material such as beryllium copper alloy, and is best illustrated in FIG. 3. The member 31 is a metal strip of shallow, undulating, or generally w-shape with a central portion 45 arched in a first direction and secured over a cylindrical boss 46 in the housing. Curved portions 48 extending from opposite sides of the central portion 45 are curved in the opposite direction to portion 45, and a short, curved bearing portion 49 at each end of the spring curves in the opposite direction to portions 48. The bearing portions 49 of the spring bear against the respective cam portions 40 of the cam pin or shaft 28.

The cam retainer 18 is mounted in the cavity 30 above the cam pin 28 and spring 31. The plug is of any suitable material such as plastic or the like. As best illustrated in FIGS. 8 to 10, the plug comprises a generally elongate, rectangular block 50 with a central, downwardly extending projection 52 which extends between the flanges 38 and into close proximity with the central portion 36 of pin 28. As best illustrated in FIG. 7, the projection 52 has a lower face 53 which is arched or angled to extend around part of the periphery of the cylindrical central portion 36. The cam retainer 18 also has an inward projection 54 from one side face. Projection 54 has an arcuate cut-out 55 for fitting over the boss 46. The plug is secured in the illustrated position in cavity 30.

Operation of the snap hinge assembly 16 will now be described in more detail with reference to FIGS. 1 to 7. When the cover is closed, as illustrated in solid lines in FIG. 2 and in FIG. 4, the cam portions 40 will be in the position illustrated in FIG. 4, with bearing portions 49 bearing against one flat face 42 adjacent an end edge 44. As the cover or flip panel 12 is rotated in a counter-clockwise position from the closed position illustrated in solid outline in FIG. 2 to the open position illustrated in dotted outline, the shaft or pin 28 will also be rotated in a counterclockwise direction. This causes the end edge 44 of each cam portion to move upwardly from the position viewed in FIG. 4, pushing the bearing portion 49 of the spring upwardly to compress or stress the spring. When the end edge 44 clears the bearing portion 49, the spring force will act to snap the shaft around to the open position, with the bearing portions 49 acting against the opposite flat face 42 of each cam portion. The cover or flip panel will therefore be held in an open position until the user forces it back towards the closed position. The cam portions and spring operate in the same manner when the cam shaft or pin is rotated back in the clockwise direction, as described in co-pending Application No. 09/045,153 referred to above.

The cam retainer 18 acts to hold the cam pin or shaft 28 axially, preventing bending of the cam pin. Without cam retainer 18, axial loading forces and bending forces on the cam pin may cause the cam pin to bend, reducing its lengthwise dimension sufficiently for it to disengage from the flip cover. This requires re-assembly of the flip cover onto the phone. The cam retainer 18 avoids this problem by providing a projection in close proximity to the central portion 36 of the cam pin, preventing any upward bending of the portion 36. The retainer or cam retainer 18 has been designed to remain inside the phone for the entire phone lifetime, and may be permanently secured to the phone housing if desired.

Although a preferred embodiment of the invention has been described above by way of example only, it will be understood by those skilled in the field that modifications may be made to the disclosed embodiment without departing from the scope of the invention, which is defined by the appended claims.

We claim:

1. A portable phone, comprising:
    a phone housing having a keypad on one face, a first end and a second end;
    a cover hinged to the second end of the housing for movement between a closed position covering at least part of the keypad and an open position; and
    a hinge mechanism pivotally connecting the cover to the second end of the housing, the hinge mechanism comprising a hinge pin rotatably mounted in the second end of the housing and releasably secured to the cover, and cam retainer member secured in the second end of the housing adjacent the hinge pin and having a portion adjacent a central part of the pin for resisting bending of the pin and disengagement from the cover.

2. The phone as claimed in claim 1, including a spring member mounted in the second end of the housing and biased against the hinge pin to releasably retain the pin in the open and closed positions of the cover.

3. The phone as claimed in claim 1, wherein the housing has a cavity at the second end, the hinge pin being rotatably mounted in the cavity and having opposite end portions releasably engaged in corresponding recesses in the cover, and the cam retainer member is also mounted in the cavity to extend over the pin.

4. The phone as claimed in claim 3, including a spring member mounted in the cavity and bearing against the hinge pin so as to urge the cover into the open position as the cover is rotated towards the open position, and into the closed position as the cover is rotated towards the closed position, the cam retainer member extending over the spring member and hinge pin.

5. The phone as claimed in claim 4, wherein the hinge pin has a central portion, enlarged cam portions on opposite sides of a central portion of the pin, and the cam portions each have opposing flat faces against which the spring acts in the open and closed positions, respectively, so as to releasably hold the hinge pin in the respective positions unless the flip or cover is positively urged away from the position, the cam retainer member having a projecting central portion extending up to the central portion of the hinge pin between said cam portions, the projecting central portion of the cam retainer member having an end face facing the central portion of the hinge pin for resisting bending of said central portion out of a straight orientation.

6. The phone as claimed in claim 5, wherein the cam retainer member comprises a generally elongate block for extending over the entire length of the hinge pin in said cavity, the block having opposite upper and lower faces and opposite side faces, and the projecting central portion of the cam retainer member projects downwardly from said lower face.

7. The phone as claimed in claim 6, wherein the cam retainer member has a side projection projecting from one side face of said block, said housing having an at least partially cylindrical boss adjacent said cavity, and the side projection having an arcuate cut-out for fitting over said boss.

8. A portable phone, comprising:

a phone housing having a keypad and opposite ends, and a cavity at one end of the housing having opposite end walls;

a hinge pin rotatably mounted in said cavity and having opposite ends projecting out of the end walls of said cavity;

a flip panel having opposite ends, one end of said flip panel having spaced ear portions releasably secured over the projecting opposite ends of said hinge pin, whereby said flip panel is rotatable between a closed position extending over at least part of said keypad and an open position rotated away from said phone housing;

said hinge pin having at least one cam portion;

a biasing spring secured in said cavity and having a bearing portion acting against said cam portion, said cam and bearing portions together comprising means for releasably retaining said flip panel in said open and closed positions; and a cam retainer mounted in said cavity and extending over said hinge pin to resist bending of said hinge pin out of a straight, axial orientation.

9. The phone as claimed in claim 8, wherein the hinge pin has a central portion and enlarged cam portions extending from opposite ends of said central portion, the biasing spring having spaced bearing portions acting against the respective cam portions, and the cam retainer having a central projection projecting into close proximity to said central portion of said hinge pin, and end portions on opposite sides of said central projecting portion spaced from said cam portions.

* * * * *